Patented Dec. 20, 1949

2,491,815

UNITED STATES PATENT OFFICE 2,491,815

5-PHENYL-5-SEC. BUTYL BARBITURIC ACID

Christian E. Kaslow and William Edward Bacon, Jr., Bloomington, Ind., assignors to Indiana University Foundation, a corporation of Indiana No Drawing. Application August 14, 1947, Serial No. 768,700

1 Claim. (Cl. 260—257)

This invention relates to a new barbiturate, 5-phenyl-5-sec. butyl barbituric acid, of the formula

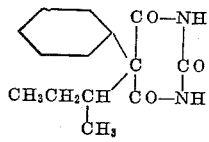

This product is a white crystalline material, M. P. 169-170° C. It has exceptional utility as a hypnotic which combines special sedative action with short duration of action, and is of particular value for clinical use where it is desirable to have cortical depression in addition to the usual hypnotic action of the barbiturates, and to have the duration of the therapeutic action relatively short, as where the product is used in conjunction with short acting drugs.

The product may be used in the form of the free acid, or may be used in the form of one of its salts, such as the sodium, potassium, ammonium, amine or other salts.

The product is conveniently prepared by the hydrolysis of the corresponding imino barbituric acid, obtained by the condensation of urea with ethyl alpha-phenyl-alpha-sec. butyl-cyanoacetate. Its preparation will be illustrated by the following example but it is not limited thereto.

*Example.*—Sodium ethoxide is prepared by adding 150 ml. of anhydrous alcohol to 23 grams of sodium in 200 ml. of anhydrous ether, using the usual precautions to maintain anhydrous conditions, in a flask equipped with a short fractionating column. This mixture is heated to 55° C. and not higher than 60° C. under a reduced pressure of 150 mm. and 117 gm. of phenyl acetonitrile are slowly added with stirring. Ethyl alcohol is distilled from the reaction mixture under these conditions at a temperature of 45° C. After 3 to 4 hours no more alcohol distills and the reaction is essentially complete. The fractionating column is replaced by a reflux condenser and 150 grams of sec. butyl bromide is added slowly while the reaction mixture is stirred and maintained at 50° C. When the addition is complete the reaction temperature is raised to 85 to 90° C. and stirring and heating are continued for 48 hours. The mixture is then cooled and diluted with water. The non-aqueous layer is separated, dried over calcium sulfate, and distilled, giving ethyl α-phenyl-α-sec. butyl-cyanoacetate.

To a mixture of 100 ml. of anhydrous ether and 13 gm. of sodium is added 250 ml. of anhydrous alcohol followed by 20 gm. of dry urea. This mixture is refluxed and 63 gm. of ethyl α-phenyl-α-sec. butyl-cyanoacetate are added dropwise. Refluxing is continued for 48 hours. The alcohol is then distilled from the reaction mixture, the mixture diluted with 600 ml. of water and subsequently acidified with hydrochloric acid. The white precipitate is filtered, washed with water and dried. The product so obtained weighs about 70 grams and is a mixture of the desired iminobarbiturate and α-phenyl-α-cyano-β-methylvaleryl urea, from which 35 to 40 gms. of the pure iminobarbiturate, M. P. 241 to 243° with decomposition, may be obtained by several crystallizations from 60% methanol.

Ten grams of the crude iminobarbituric is refluxed for thirty minutes with 400 ml. of 3 N hydrochloric acid, then cooled. The 5-phenyl-5-sec.-butylbarbituric acid crystallizes from the solution as white needles. The solid is removed by filtration, dissolved in 200 ml. of 3% sodium hydroxide solution and the barbituric acid precipitated by the gradual acidification with dilute hydrochloric acid. The substance is purified further by recrystallization from hot water, M. P. 169 to 170° C.

We claim:

5-phenyl-5-sec.-butyl barbituric acid.

CHRISTIAN E. KASLOW.
WILLIAM EDWARD BACON, Jr.

REFERENCES CITED

The following references are of record in the file of this patent:

UNITED STATES PATENTS

| Number | Name | Date |
|---|---|---|
| 2,182,518 | Dox | Dec. 5, 1939 |
| 2,250,424 | Shonle | July 22, 1941 |

OTHER REFERENCES

Chemical Abstracts, 29, 1782[2] (1935).
Chemical Abstracts, index of vol. 31 (1937), page 9573.